(12) United States Patent
Kuraoka et al.

(10) Patent No.: US 10,843,345 B2
(45) Date of Patent: Nov. 24, 2020

(54) WORKPIECE HOLDING MECHANISM

(71) Applicant: KAWASAKI JUKOGYO KABUSHIKI KAISHA, Kobe (JP)

(72) Inventors: Shuhei Kuraoka, Akashi (JP); Keita Sasaki, Akashi (JP); Tatsuhiro Uto, Akashi (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 16/313,674

(22) PCT Filed: Jun. 26, 2017

(86) PCT No.: PCT/JP2017/023356
§ 371 (c)(1),
(2) Date: Dec. 27, 2018

(87) PCT Pub. No.: WO2018/003733
PCT Pub. Date: Jan. 4, 2018

(65) Prior Publication Data
US 2020/0070359 A1    Mar. 5, 2020

(30) Foreign Application Priority Data
Jun. 27, 2016    (JP) .................. 2016-126572

(51) Int. Cl.
*B25J 15/00*    (2006.01)
(52) U.S. Cl.
CPC ................ *B25J 15/0033* (2013.01)

(58) Field of Classification Search
CPC ................ B25J 15/0033; B25J 15/0253; B25J 15/0038; B25J 18/00; B25J 9/0087;
(Continued)

(56) References Cited

U.S. PATENT DOCUMENTS 6,592,324 B2 * 7/2003 Downs ................ B25J 15/0253
                                                    294/104
7,422,411 B2 * 9/2008 Downs ................ B25J 15/0253
                                                    294/104
(Continued)

FOREIGN PATENT DOCUMENTS

| CN | 102556383 B | 12/2014 |
| JP | H08-316287 A | 11/1996 |

(Continued)

*Primary Examiner* — Stephen A Vu
(74) *Attorney, Agent, or Firm* — Oliff PLC

(57) ABSTRACT

A workpiece holding mechanism includes a first and second support having a first and second surface part, third support having a third surface part located closer to second than first surface part and located at a height corresponding to first surface part's lower end, fourth support having a fourth surface part located closer to first than second surface part and located at a height corresponding to second surface's part lower end, a fifth support having a fifth surface part located, at first surface part one end in first direction, closer to second than first surface part and located above third surface part, and a sixth support having a sixth surface part, at second surface part's end portion, closer to the first than second surface part and located above fourth surface part. At least one third and fourth face part includes one face or plurality of faces extending in first direction.

9 Claims, 11 Drawing Sheets

(58) Field of Classification Search
CPC ...... Y10T 74/20305; G01N 2035/0405; G01N 35/0099; B66C 1/42; Y10S 901/31
See application file for complete search history.

(56) References Cited

U.S. PATENT DOCUMENTS

| | | | | |
|---|---|---|---|---|
| 8,857,875 | B2* | 10/2014 | Suyama | B25J 15/0052 |
| | | | | 294/119.1 |
| 8,899,649 | B2* | 12/2014 | Li | C25D 11/005 |
| | | | | 294/119.1 |
| 9,004,560 | B2* | 4/2015 | Umeno | B25J 15/0033 |
| | | | | 294/119.1 |
| 2012/0083920 | A1* | 4/2012 | Suyama | B25J 9/0084 |
| | | | | 700/230 |

FOREIGN PATENT DOCUMENTS

| | | |
|---|---|---|
| JP | 2002-141389 A | 5/2002 |
| KR | 10-20130025236 A | 3/2013 |

* cited by examiner (A)

(B)

(A)

(B)

WORKPIECE HOLDING MECHANISM

TECHNICAL FIELD

The present disclosure relates to a workpiece holding mechanism.

BACKGROUND ART

Substrate conveyor robots convey substrates by moving, three-dimensionally in space, their arms holding the substrates. Semiconductor substrates are lower in strength than substrate-like electronic components such as printed circuit boards. Thus, when being conveyed, such a semiconductor substrate is commonly held by being placed on a main surface of a substrate conveyor blade. For example, Patent Documents 1 and 2 disclose substrate conveyor blades which hold a substrate fitted in a recessed portion of the blade and position the substrate.

In recent years, the viewpoint of improving productivity has generated the idea of introducing robots to worksites conventionally handled by human workers, for collaboration between robots and workers in the same workspace.

REFERENCE DOCUMENT OF CONVENTIONAL ART

Patent Documents

[Patent Document 1] JP1996-316287A
[Patent Document 2] JP2002-141389A

DESCRIPTION OF THE DISCLOSURE

Problems to be Solved by the Disclosure

Unfortunately, when being introduced to a worksite for assembly of electronic components, the conventional substrate conveyor robot may fail to pick up a pile of substrates and to convey it to a certain place due to the structure of such a blade. Similar problems may occur in the above-mentioned case in which a workpiece is to be held by the conventional blade.

One purpose of the present disclosure is to provide a workpiece holding mechanism having an alignment function.

Summary of the Disclosure

According to one aspect of the present disclosure, a workpiece holding mechanism having a first arm and a second arm configured to be movable in a three-dimensional space is provided. The mechanism includes a first support provided to a tip of the first arm and having a first surface part defined by one of a surface extending in a first direction in a horizontal plane and a plurality of surfaces aligned in the first direction, a second support provided to a tip of the second arm, and having a second surface part opposed to the first surface part and defined by one of a surface extending in the first direction and by a plurality of surfaces aligned in the first direction, a third support provided to the first support, and having a third surface part located closer to the second surface part than the first surface part is and located at a height corresponding to a lower end of the first surface part, a fourth support provided to the second support, and having a fourth surface part located closer to the first surface part than the second surface part is and located at a height corresponding to a lower end of the second surface part, a fifth support provided to the first support, and having a fifth surface part located, at one end of the first surface part in the first direction, closer to the second surface part than the first surface part is and located above the third surface part, and a sixth support provided to the second support, and having a sixth surface part is located, at an end portion of the second surface part opposed to the other end of the first surface part in the first direction, closer to the first surface part than the second surface part is and located above the fourth surface part. At least one of the third surface part and the fourth surface part is defined by one of a surface extending in the first direction and a plurality of surfaces aligned in the first direction.

According to this configuration, by moving the second support relatively with respect to the first support to adjust the distance between the first surface part and the second surface part, while keeping the first surface part and the second surface part parallel to each other and keeping the third surface part and the fourth surface part at the same height, the right and left ends of a substrate (workpiece) are supported while the substrate vertically adjusted to stay horizontal. Here, by moving the second support relatively in the first direction with respect to the first support, while keeping the first surface part and the second surface part parallel to each other and keeping the third surface part and the fourth surface part at the same height, the front and rear ends of the substrate are supported. Thus, since the substrates are held in a state where misalignments in a rotation direction, an inclined direction, and a height direction in a plan view of the substrate are adjusted, the substrates are conveyed to a given position in a three-dimensional space. For example, a pile of substrates are set in an inspection device (e.g., ICT).

The second support may move with respect to the first support to adjust a distance between the first surface part and the second surface part, while keeping the first surface part and the second surface part parallel to each other and keeping the third surface part and the fourth surface part at the same height.

The second support May move in the first direction with respect to the first support, while keeping the first surface part and the second surface part parallel to each other and keeping the third surface part and the fourth surface part at the same height.

The workpiece holding mechanism may include a robot having the first arm and the second arm.

Effects of the Disclosure

The present disclosure provides the workpiece holding mechanism having the alignment function, The above objects, other objects, features and advantages of the present disclosure will be apparent from the following detailed description of preferable embodiments with reference to the accompanying drawings.

MODES FOR CARRYING OUT THE DISCLOSURE

Embodiments of the present disclosure will be described below with reference to the accompanying drawings. Note that, in the following, the same or corresponding elements are denoted by the same referential characters throughout the drawings to omit redundant description.

Embodiment 1

Figure 1:
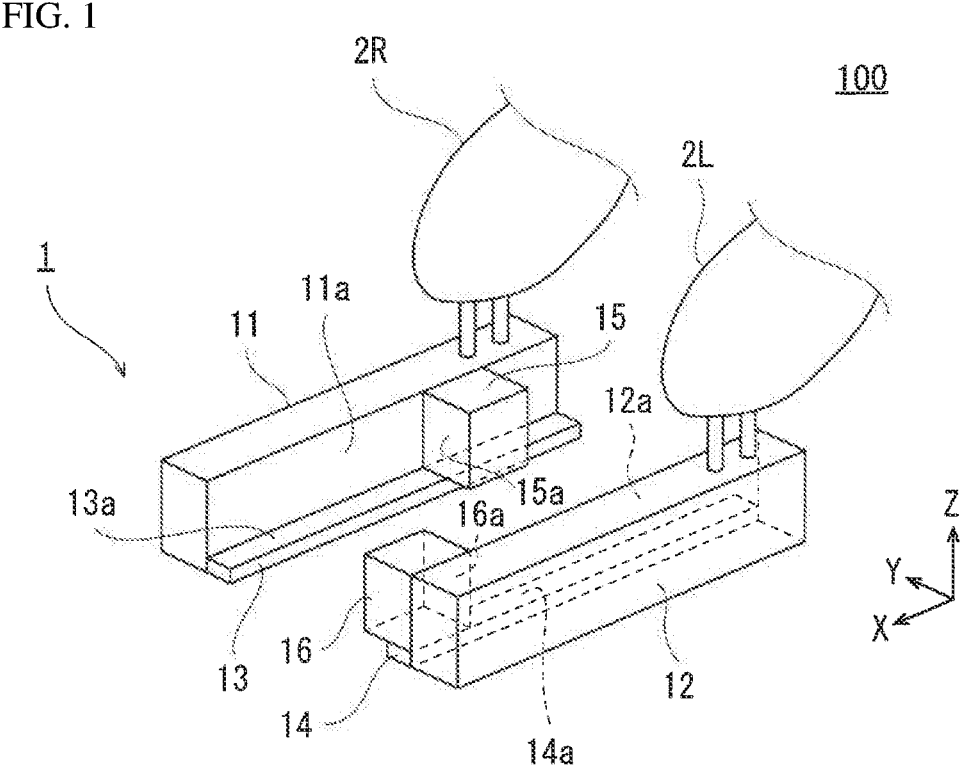
FIG. 1 is a perspective view illustrating a structure of a substrate holding mechanism according to Embodiment 1 of the present disclosure.
Figure 2:
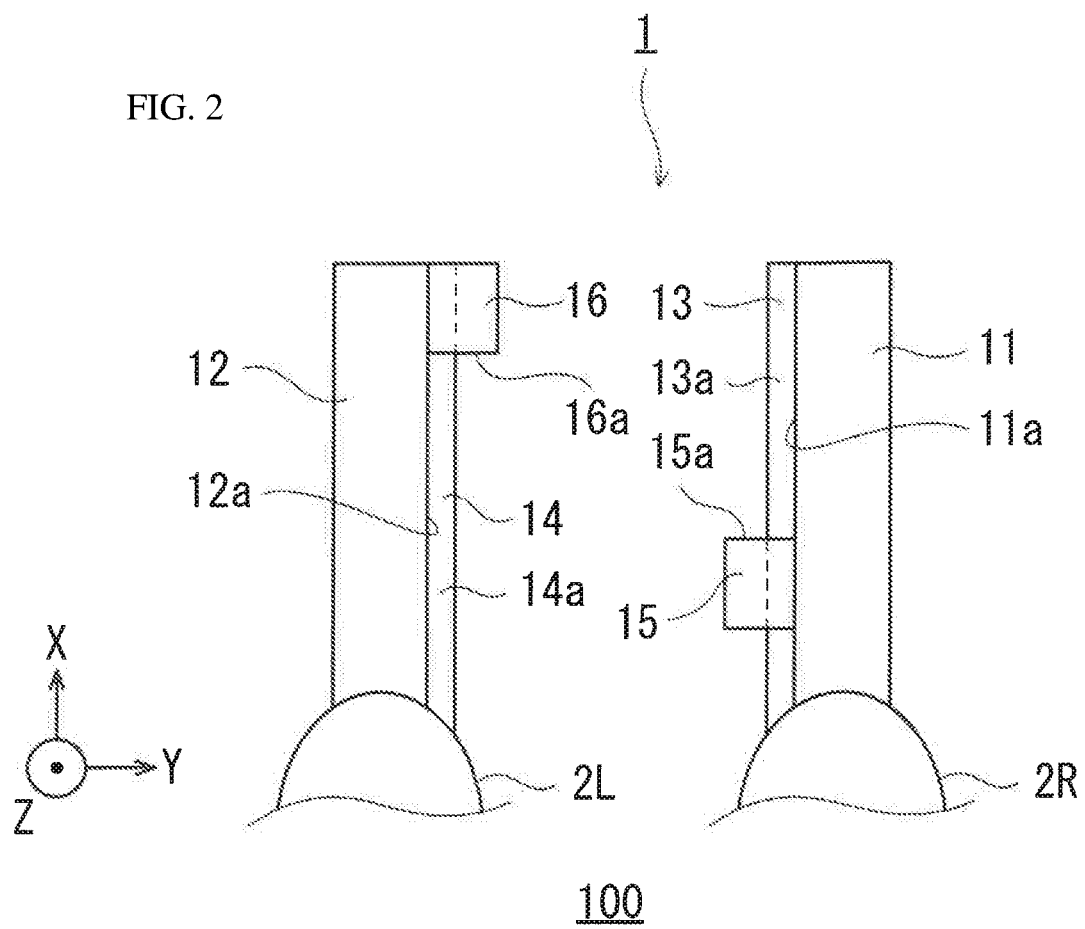
FIG. 2 is a plan view illustrating the substrate holding mechanism shown in FIG. 1.

FIG. 1 is a perspective view illustrating a structure of a substrate holding mechanism according to Embodiment 1 of the present disclosure. FIG. 2 is a plan view illustrating the substrate holding mechanism. The substrate holding mechanism 1 is a tool attached to the tip of a first robot arm 2R (hereinafter referred to as "first arm 2R") and the tip of a second robot arm 2L (hereinafter referred to as "second arm 2L") of a robot 100. The substrate holding mechanism 1 holds substrate-like electronic components (workpieces) and has an alignment function for the substrates (workpieces). In FIGS. 1 and 2, three axes, namely, X-axis, Y-axis, and Z-axis orthogonal to one another are defined. The X, Y, and Z axes correspond to a hand coordinate system defined with respect to the tips of the first arm 2R and the second arm 2L.

The substrate holding mechanism 1 includes a first support 11 provided to the tip of the first arm 2R, a second support 12 provided to the tip of the second arm 2L, a third support 13 provided to the first support 11, a fourth support 14 provided to the second support 12, a fifth support 15 provided to the first support 11, and a sixth support 16 provided to the second support 12.

The first support 11 is shaped into a rectangular parallelepiped. The upper surface of an end portion of the rectangular parallelepiped is fixed to the first arm 2R via two fixtures. One side of the rectangular parallelepiped (the side located in the positive direction of the Y-axis) is a strip-like surface (first surface part 11a) extending in a first direction (X-axis direction) in a horizontal plane (X-SCF plane).

The second support 12 is shaped into a rectangular parallelepiped. The upper surface of an end portion of the rectangular parallelepiped is fixed to the second arm 2L via two fixtures. One side of the rectangular parallelepiped (the side in the negative direction of the Y-axis) is opposed to the first surface part 11a and is a strip-like surface (second surface part 12a) extending in the first direction (the X-axis direction in the drawing).

The third support 13 is shaped into a flat plate. One side of the flat plate (the side in the positive direction of the Y-axis) is directly fixed to the first surface part 11a. The upper surface of the flat plate protrudes from the lower end of the first surface part 11a toward the second surface part 12a, and forms a third surface part 13a extending in the same direction as the extending direction of the first surface part 11a (X-axis direction). The third surface part 13a is located closer to the second surface part 12a than the first surface part 11a is, and is located at the height corresponding to the lower end of the first surface part 11a.

The fourth support 14 is shaped into a flat plate. One side of the flat plate (the side in the negative direction of the Y-axis) is directly fixed to the second surface part 12a. The upper surface of the flat plate protrudes from the lower end of second surface part 12a toward the first surface part, and forms a fourth surface part 14a extending in the same direction as the extending direction of the second surface part 12a. The fourth surface part 14a is located closer to the first surface part 11a than the second surface part 12a is, and is located at the height corresponding to the lower end of the second surface part 12a. In this embodiment, both the third surface part 13a and the fourth surface part 14a constitute one plane extending in the first direction (the positive direction of the X-axis).

The fifth support 15 is shaped into a rectangular parallelepiped. One side of the rectangular parallelepiped (the side in the positive direction of the Y-axis) is directly fixed to the first surface part 11a. At one end of the first surface part 11a in the first direction (X direction), another side of the rectangular parallelepiped (the side in the positive direction of the X-axis) is located closer to the second surface part 12a than the first surface part 11a is, and forms a fifth surface part 15a located above the third surface part 13a.

The sixth support 16 is shaped into a rectangular parallelepiped. One side of the rectangular parallelepiped (the side in the negative direction of the Y-axis) is directly fixed to the second surface part 12a. At the end portion of the second surface part 12a opposed to the other end of the first surface part 11a in the first direction, another side of the rectangular parallelepiped (the side in the negative direction of the X-axis) is located closer to the first surface part 11a than the second surface part 12a is, and forms a sixth surface part 16a located above the fourth surface part 14a.

Although FIGS. 1 and 2 show the first surface part 11a and the second surface part 12a opposed and parallel to each other (extending in the same direction), the first surface part 11a, and the second surface part 12a may be oriented at any angle because the first arm 2R and the second arm 2L are capable of moving the first support 11 and second support 12, respectively, in the three-dimensional space.

Figure 3:
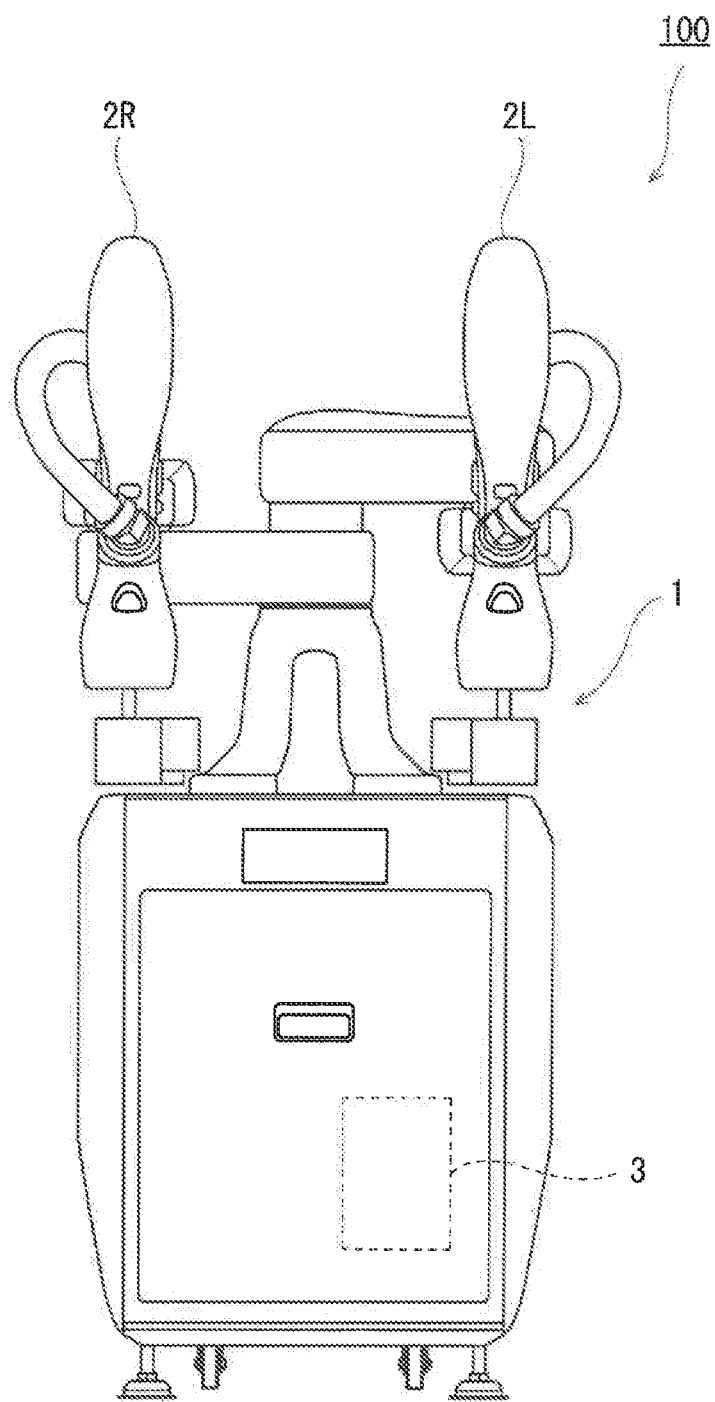
FIG. 3 is a front view illustrating a structure of a robot.

The following describes a structure of the robot 100 including the substrate holding mechanism 1. FIG. 3 is a front view illustrating a structure of the robot 100. As shown in FIG. 3, the robot 100 includes a base 4, the first arm 2R and the second arm 2L provided in a pair and supported by the base 4, and a control device 3 housed in the base 4. The first arm 2R on the right side and the second arm 2L on the left side are movable in the three-dimensional space. The first arm 2R and the second arm 2L are capable of moving independently of each other and moving in conjunction with each other. The first arm 2R and the second arm 2L may be a commonly-employed horizontal articulated robot arm, the structure of which is known. Thus, the detailed description of the first arm 2R and the second arm 2L will be omitted. In this embodiment, a tool (1) is fixed to the tips of the first arm 2R and the second arm 2L via the fixtures. Alternatively, the tool (1) may be removably attached to the tips of the first arm 2R and the second arm 2L via mechanical interfaces.

Figure 4:
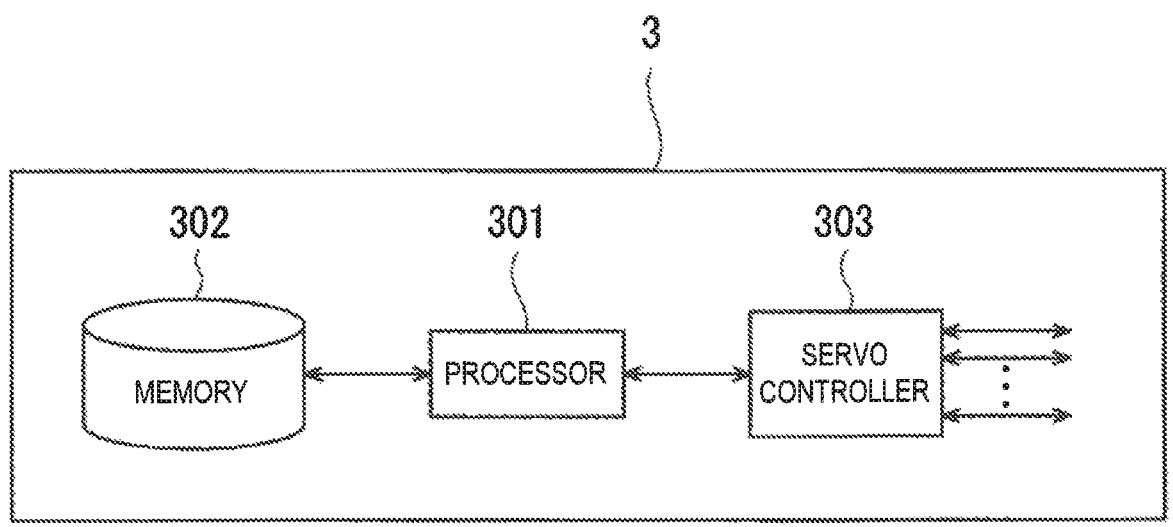
FIG. 4 is a block diagram illustrating a schematic structure of a control device.

The following describes the control device 3. FIG. 4 is a block diagram illustrating a schematic structure of the control device 3. As shown in FIG. 4, the control device 3 includes a processor 301 such as a CPU, a memory 302 such as a ROM or RAM, and a servo controller 303. The control device 3 is, for example, a robot controller including a computer such as a microcontroller. The control device 3 may include a control device that performs a centralized control or may include a plurality of control devices that perform a distributed control in a collaborative manner. The memory 302 stores information including a basic program as a robot controller, various types of fixed data, etc. The processor 301 controls various movements of the robot 100 by reading and executing software such as the basic program stored in the memory 302. In other words, the processor 301 generates control commands for the robot 100 and outputs them to the servo controller 303. The servo controller 303 controls the driving of servomotors corresponding to the joint axes of the first arm 2R and the second arm 2L of the robot 100 based on the control commands generated by the processor 3011. In the case where the tool (1) is configured to allow movements of other members such as the mechanical interfaces attached to the first arm 2R and the second arm 2L, these movements may also be controlled by the control device 3. Thus, the control device 3 controls movements of the entirety of the robot 100.

Figure 5:
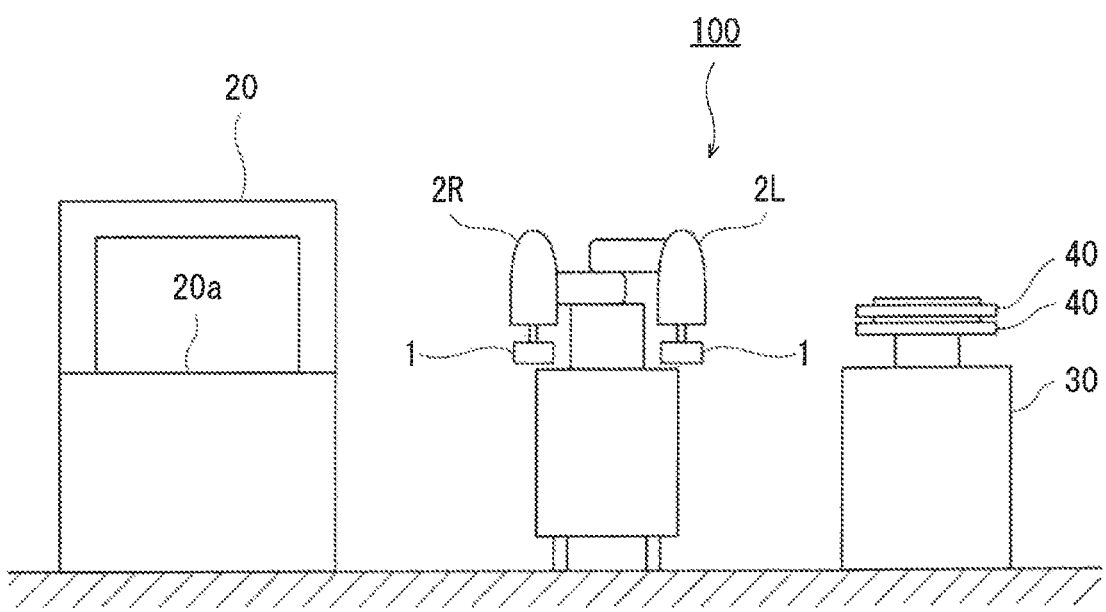
FIG. 5 is a side view illustrating an example of a worksite in which the robot is employed.

FIG. 5 is a side view illustrating an example of a worksite in which the robot 100 is employed. As shown in FIG. 5, the robot 100 is introduced to a worksite for assembly of electronic components. On the right side of the robot 100, a substrate temporary placement table 30 is installed. Printed circuit boards 40 are piled on the substrate temporary placement table 30. Each printed circuit board 40 is placed with its substrate side facing downward and its circuit side facing upward. On the left side of the robot 100, an inspection device 20 is installed. The inspection device 20 is an in-circuit tester (ICT) in this embodiment. The ICT electrically conducts, without activating the substrate, characteristic tests on the individual components on the substrate by using minute power to detect any failure which is otherwise difficult to detect through visual inspections. The robot 100 is responsible for part of the inspection of the printed circuit boards 40. The robot 100 picks up two printed circuit boards 40 from the top of the pile of the printed circuit boards 40 on the substrate temporary placement table 30 and conveys them to a given position on an inspection table 20a of the inspection device 20.

Figure 6:
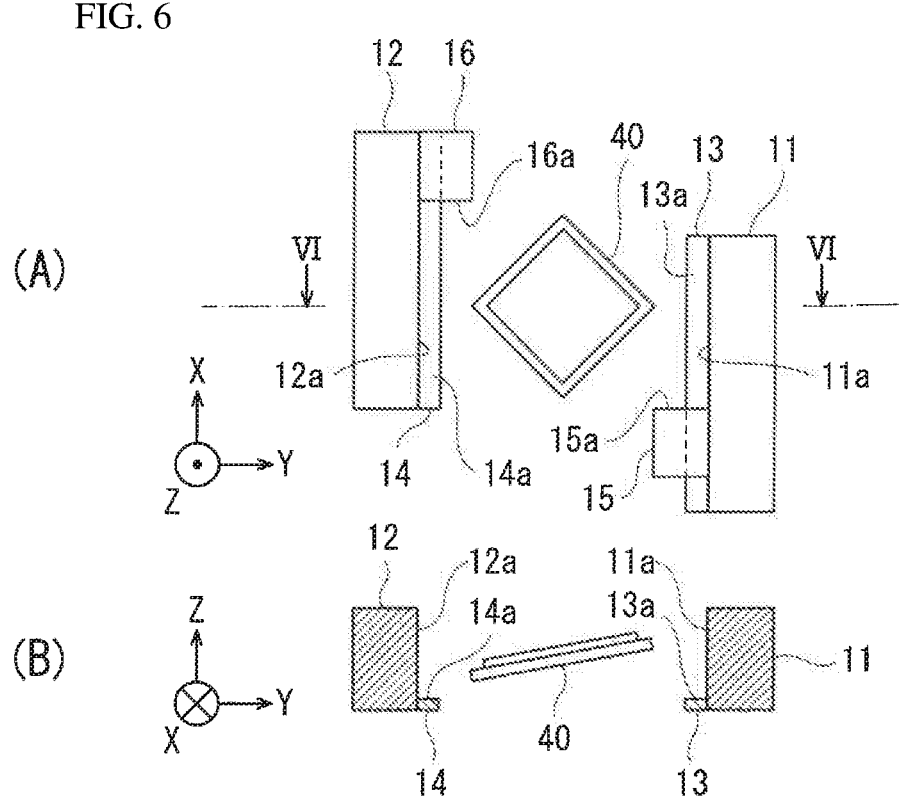
FIGS. 6A and 6B are diagrams schematically illustrating a first movement of the robot.

The following describes movements of the robot. In the following drawings, three axes, namely, X-axis, Y-axis, and Z-axis orthogonal to one another are defined. The X, Y, and Z axes correspond to a hand coordinate system defined with respect to the tips of the first arm 2R and the second arm 2L. First, the control device 3 controls the movements of the first arm 2R and the second arm 2L for alignment with the printed circuit boards 40 on the substrate temporary placement table 30 (a first movement of the robot). FIGS. 6A and 6B are diagrams schematically illustrating the first movement of the robot. FIG. 6A is a plan view illustrating the substrate holding mechanism 1 and the printed circuit boards 40 during the first movement. FIG. 6B is a cross-sectional view taken along the line VI-VI. The drawings simply show the substrate holding mechanism 1 and the uppermost printed circuit board 40 alone. As shown in FIGS. 6A and 6B, the control device 3 causes the first support 11 and the second support 12 to move such that the printed circuit boards 40 are located between the first surface part 11a and the second surface part 12a. The position of the substrate temporary placement table 30 may be prestored in the memory 302 or may be manually adjusted by remote control.

Meanwhile, in a case where the printed circuit boards 40 are roughly piled on the substrate temporary placement table 30 by a human worker, the uppermost printed circuit board 40 is misaligned in the rotation direction (X-Y plane) and the height direction (Z direction) as shown in FIGS. 6A and 6B. Since various components are mounted on the circuit side of the printed circuit board 40, the front surface on the circuit side is uneven, which is likely to cause such a misalignment.

Figure 7:
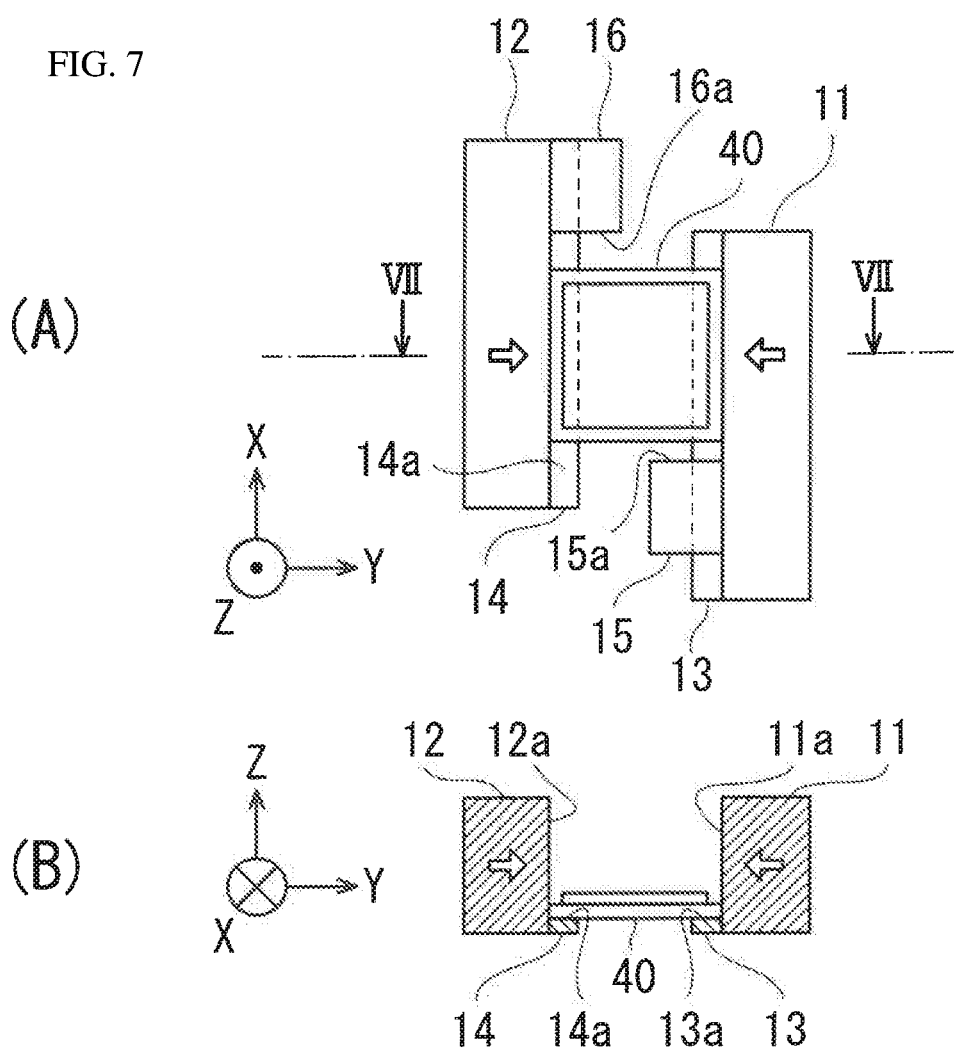
FIGS. 7A and 7B are diagrams schematically illustrating a second movement of the robot.

Next, the control device 3 controls the movements of the first arm 2R and the second arm 2L such that these arms support the right and left ends of the printed circuit boards 40 on the substrate temporary placement table 30 (a second movement of the robot). FIGS. 7A and 7B are diagrams schematically illustrating the second movement of the robot 100. FIG. 7A is a plan view illustrating the substrate holding mechanism 1 and the printed circuit boards 40 during the first movement. FIG. 7B is a cross-sectional view taken along the line VII-VII. As shown in FIGS. 7A and 7B, the control device 3 causes the second support 12 to relatively move with respect to the first support 11 to adjust the distance between the first surface part 11a and the second surface part 12a, while keeping the first surface part 11a and the second surface part 12a parallel to each other and keeping the third surface part 13a and the fourth surface part 14a at the same height. Thus, the right and left ends of the printed circuit boards 40 are supported while the printed circuit boards 40 are vertically adjusted to stay horizontal.

Figure 8:
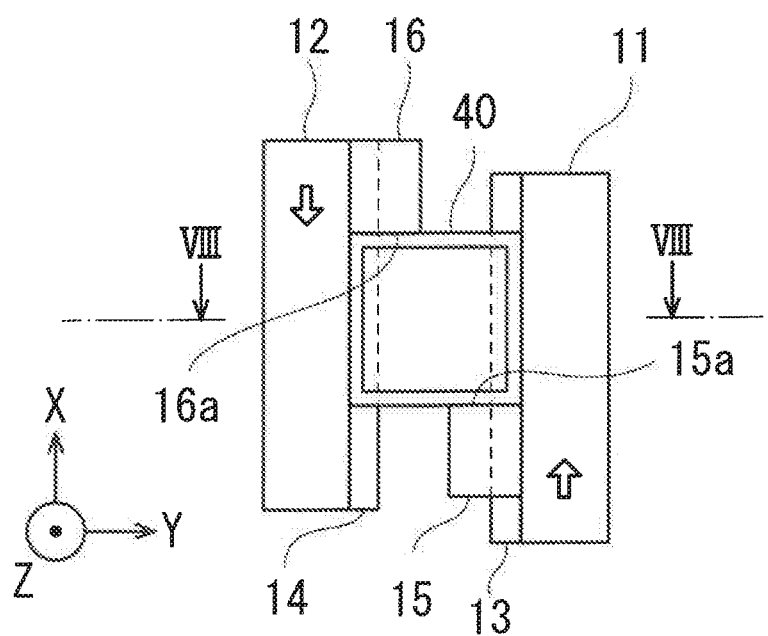
FIGS. 8A and 8B are diagrams schematically illustrating a third movement of the robot.
Figure 8:
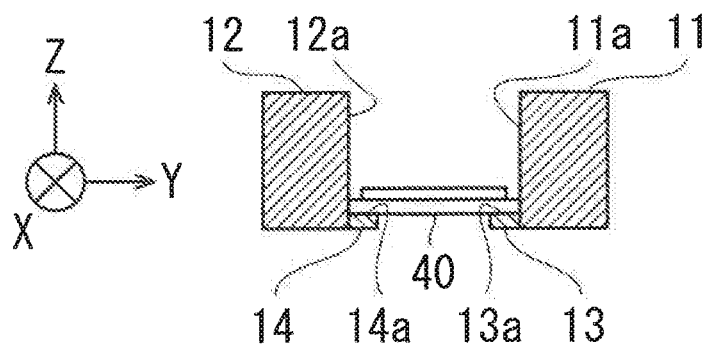

Next, the control device 3 controls the movements of the first arm 2R and the second area 2L such that these arms support the front and rear ends of the printed circuit boards 40 on the substrate temporary placement table 30 (a third movement of the robot). FIGS. 8A and 8B are diagrams schematically illustrating the third movement of the robot. FIG. 8A is a plan view illustrating the substrate holding mechanism 1 and the printed circuit boards 40 during the first movement. FIG. 8B is a cross-sectional view taken along the line VII-VII. As shown in FIGS. 8A and 8B, the control device 3 causes the second support 12 to move relatively in the first direction with respect to the first support 11, keeping the first surface part 11a and the second surface part 12a parallel to each other and keeping the third surface part 13a and the fourth surface part 14a at the same height. Thus, the substrates are held, with the misalignment of the printed circuit boards 40 in the rotation direction and the height direction being compensated. The printed circuit boards 40 are conveyed to a given position on the inspection table 30a of the inspection device 20. As described above, this embodiment enables the robot 100 to load a pile of the printed circuit boards 40 in the inspection device 20.

Embodiment 2

The following describes Embodiment 2. The basic structure of a substrate holding mechanism 1 according to this embodiment is as in Embodiment 1. The description of the structure identical to the structure in Embodiment 1 will be omitted, and only the distinctive structure will be described below.

Figure 9:
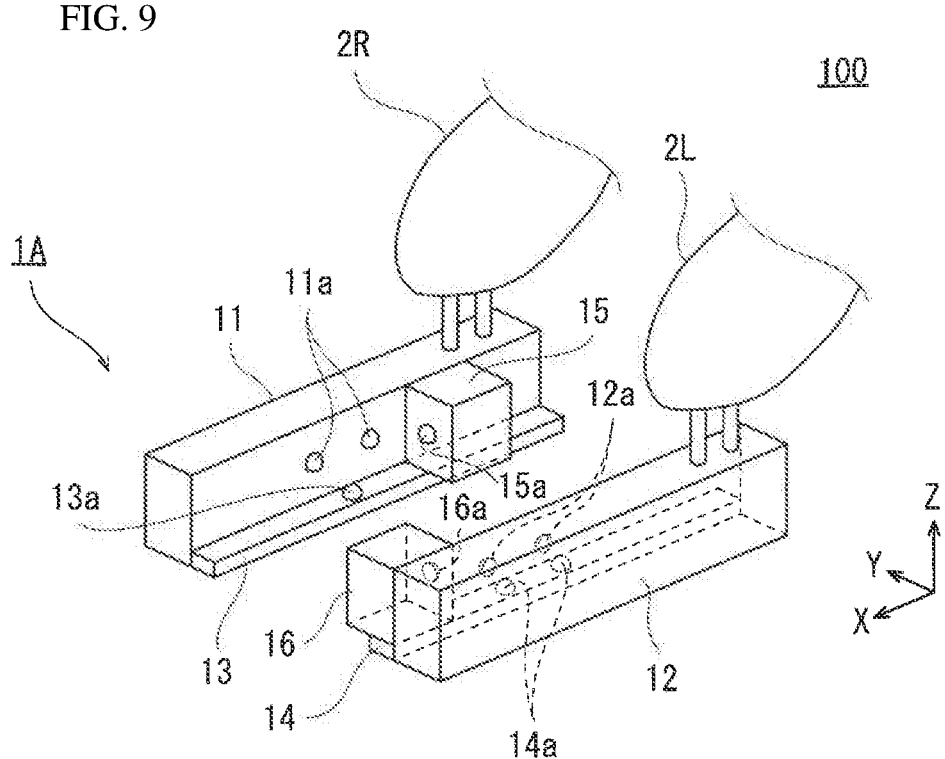
FIG. 9 is a perspective view illustrating a structure of a substrate holding mechanism according to Embodiment 2 of the present disclosure.
Figure 10:
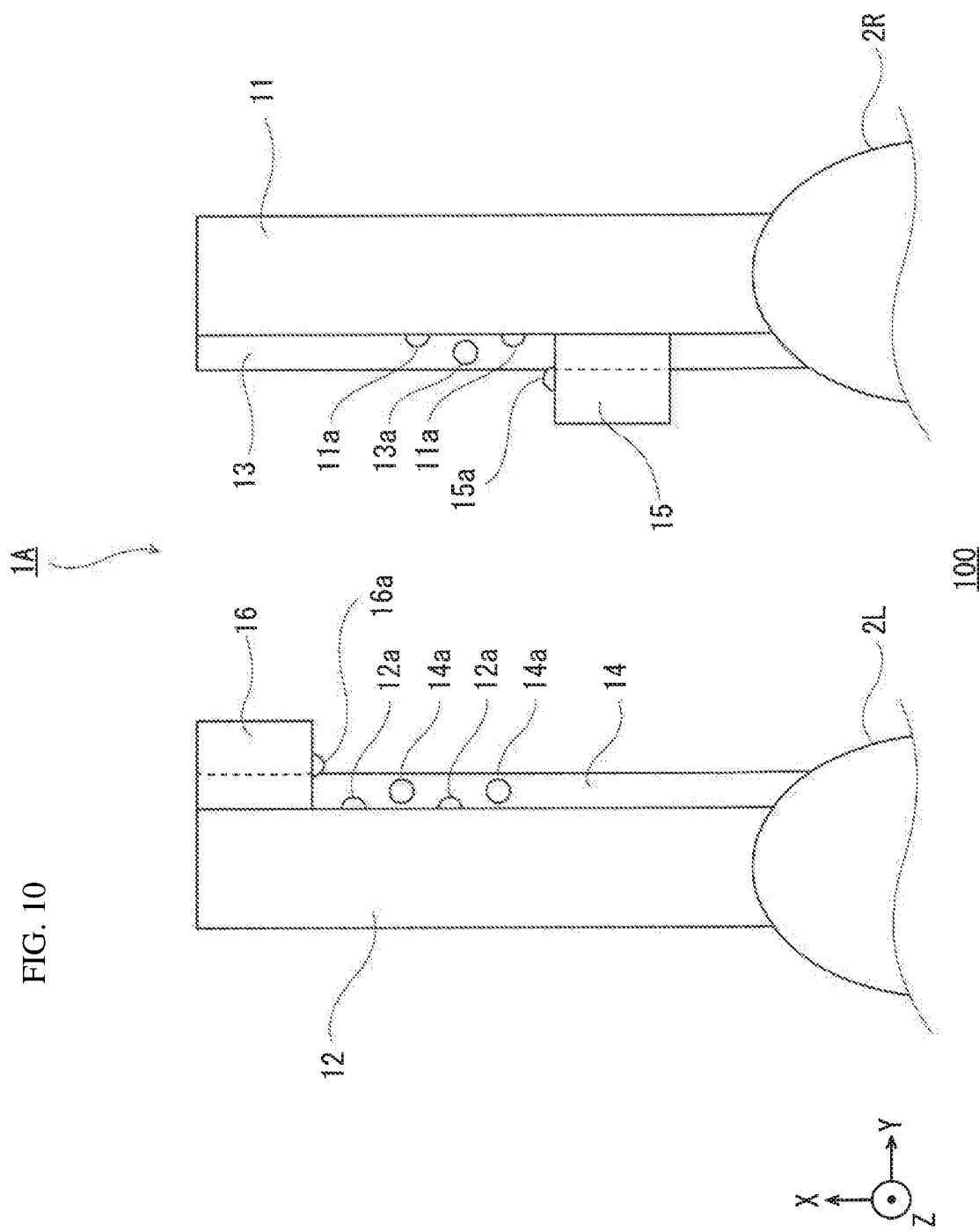
FIG. 10 is a plan view illustrating the substrate holding mechanism shown in FIG. 9.

FIG. 9 is a perspective view illustrating a structure of the substrate holding mechanism 1A according to Embodiment 2 of the present disclosure. FIG. 10 is a plan view illustrating the substrate holding mechanism 1A shown in FIG. 9. The substrate holding mechanism 1A according to this embodiment is different from the substrate holding mechanism according to Embodiment 1 in that the first surface part 11a to the sixth surface part 16a are defined by ultrasmall surfaces at the vertexes of small hemispherical members.

As shown in FIGS. 9 and 10, the first surface part 11a is defined by ultrasmall surfaces at the vertexes of two hemispherical members disposed side by side in the first direction (the positive direction of the X-axis). The second surface part 12a is opposed to the first surface part 11a and is defined by ultrasmall surfaces at the vertexes of two hemispherical members disposed side by side in the first direction (the positive direction of the X-axis). The third surface part 13a is defined by an ultrasmall surface at the vertex of a hemispherical member. The fourth surface part 14a is defined by ultrasmall surfaces at the vertexes of two spherical members disposed side by side in the first direction (the positive direction of the X-axis). The fifth surface part 15a and the sixth surface part 16a are each defined by an ultrasmall surface at the vertex of a hemispherical member.

Figure 11:
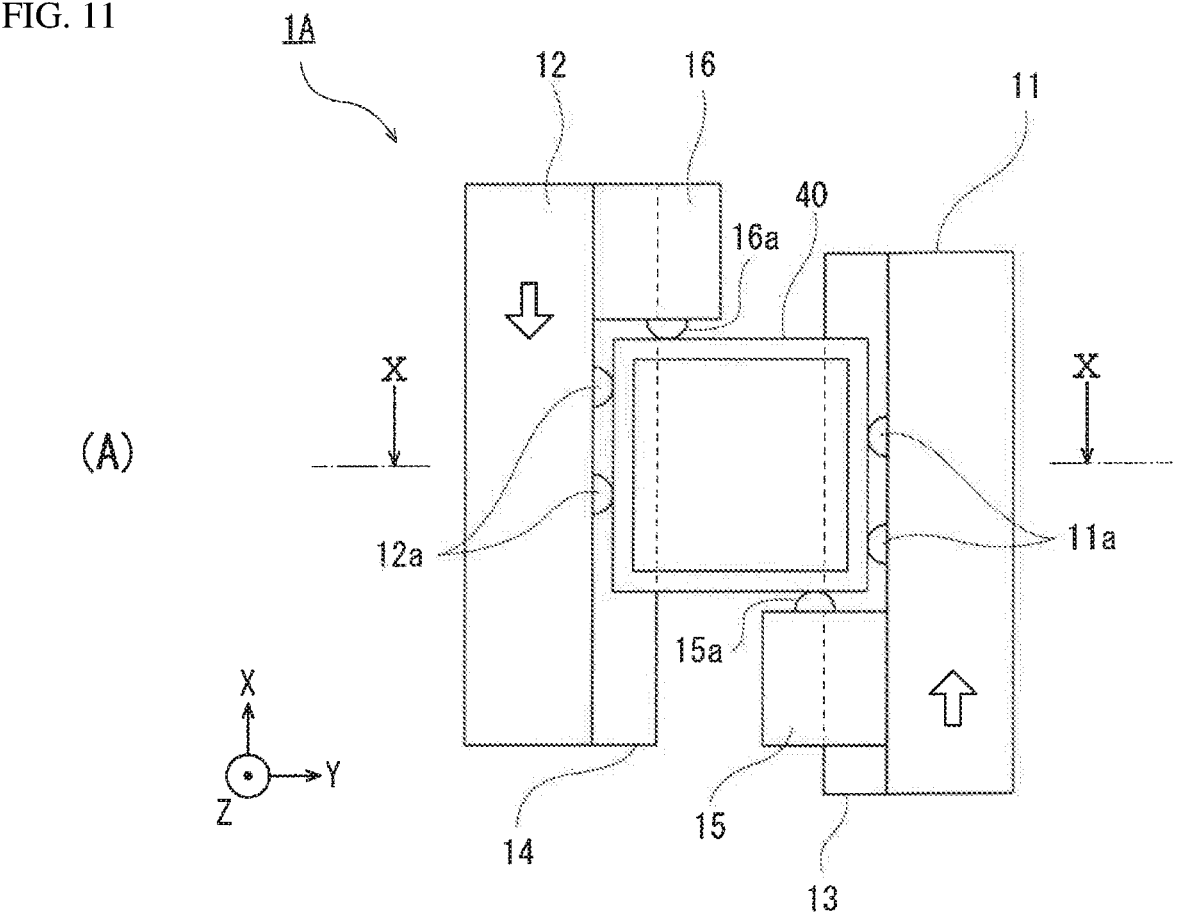
FIGS. 11A and 11B are diagrams schematically illustrating a movement of the robot.
Figure 11:
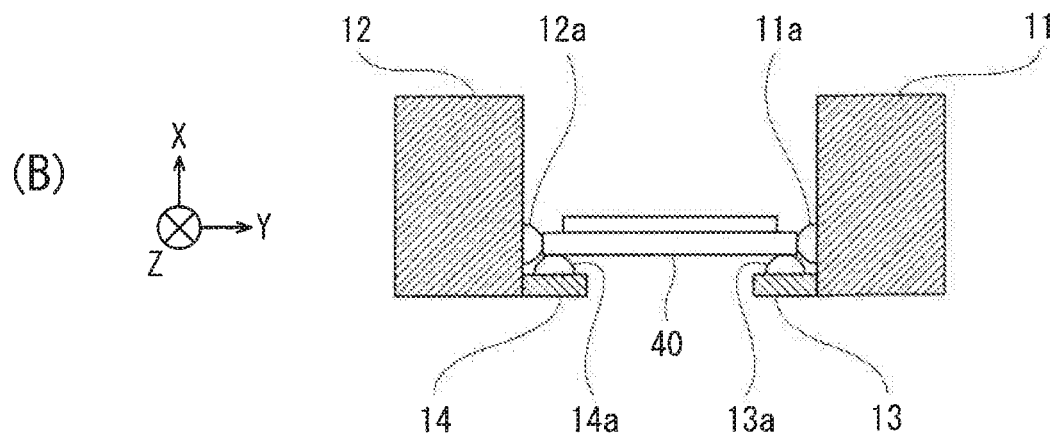

In this embodiment as well, the control device 3 controls the movements of the first arm 2R and the second arm 2L (the first to third movements), so that the substrate holding mechanism 1A is capable of holding the printed circuit boards 40 as shown in FIGS. 11A and 11B, with their misalignment in the rotation direction and the height direction being compensated. Thus, the printed circuit boards 40 are conveyed to the inspection table 30a of the inspection device 20.

Note that the first surface part 11a and the second surface part 12a may be defined by three or more surfaces aligned in the first direction (X-axis direction).

Alternatively, at least one of the third surface part 13a and the fourth surface part 14a may be defined by one of a surface extending in the first direction (X-axis direction) and a plurality of ultrasmall surfaces aligned in the first direction.

In the above embodiments, the workpieces are the printed circuit boards 40, but are not limited thereto. The workpieces may be substrate-like electronic components, such as flexible printed circuit boards, rigid-flexible circuit boards, or glass substrates of liquid crystal displays. Furthermore, any workpiece that is stronger than semiconductor substrates may be held and aligned owing to the structure similar to the structures described in the above embodiments.

The inspection device 20, which is an in-circuit tester in the above embodiments, may be a board tester or any other inspection device configured to inspect the substrate-like electronic components.

From the above description, it is apparent for a person skilled in the art that many improvements and other embodiments of the present disclosure are possible. Therefore, the above description is to be interpreted only as illustration, but is provided in order to teach a person skilled in the art the best modes that implement the present disclosure. Details of the structures and/or the functions of the present disclosure may substantially be changed without departing from the spirit of the present disclosure.

INDUSTRIAL AVAILABILITY

The present disclosure is useful for the introduction of robots to worksites conventionally handled by human workers.

DESCRIPTION OF REFERENCE CHARACTERS

1: Substrate Holding Mechanism (Tool)
2L, 2R: Arm
3: Control Device
4: Base
11: First Support
12: Second Support
13: Third Support
14: Fourth Support
15: Fifth Support
16: Sixth Support
11a: First Surface Part
12a: Second Surface Part
13a: Third Surface Part
14a: Fourth Surface Part
15a: Fifth Surface Part
16a: Sixth Surface Part
20: Inspection Device
20a: Inspection Table
30: Substrate Temporary Placement Table
40: Printed Circuit Board (Workpiece)
100: Robot
301: Processor
302: Memory
303: Servo Controller

The invention claimed is:

1. A workpiece holding mechanism comprising:
a first arm and a second arm each being configured to move in a three-dimensional space;
a first support provided to a tip of the first arm and having a first surface part defined by one of a surface extending in a first direction in a horizontal plane and a plurality of surfaces aligned in the first direction;
a second support provided to a tip of the second arm, and having a second surface part opposed to the first surface part and defined by one of a surface extending in the first direction and by a plurality of surfaces aligned in the first direction;
a third support provided to the first support, and having a third surface part located closer to the second surface part than the first surface part is and located at a height corresponding to a lower end of the first surface part;
a fourth support provided to the second support, and having a fourth surface part located closer to the first surface part than the second surface part is and located at a height corresponding to a lower end of the second surface part;
a fifth support provided to the first support, and having a fifth surface part located, at one end of the first surface part in the first direction, closer to the second surface part than the first surface part is and located above the third surface part; and
a sixth support provided to the second support, and having a sixth surface part is located, at an end portion of the second surface part opposed to the other end of the first surface part in the first direction, closer to the first surface part than the second surface part is and located above the fourth surface part, wherein
at least one of the third surface part and the fourth surface part is defined by one of a surface extending in the first direction and a plurality of surfaces aligned in the first direction, and
the fifth support is arranged closer to a base of the first support than the sixth support, and the sixth support is arranged closer to a distal end of the second support than the fifth support.

2. The workpiece holding mechanism according to claim 1, wherein the second support moves with respect to the first support to adjust a distance between the first surface part and the second surface part, while keeping the first surface part and the second surface part parallel to each other and keeping the third surface part and the fourth surface part at the same height.

3. The workpiece holding mechanism according to claim 2, wherein the second support moves in the first direction with respect to the first support, while keeping the first surface part and the second surface part parallel to each other and keeping the third surface part and the fourth surface part at the same height.

4. A robot comprising the workpiece holding mechanism according to claim 3.

5. A robot comprising the workpiece holding mechanism according to claim 2.

6. A robot comprising the workpiece holding mechanism according to claim 1.

7. The workpiece holding mechanism according to claim 1, wherein:
   the first support and the third support are arranged such that the first surface part and the third surface part are orthogonal to each other; and
   the second support and the fourth support are arranged such that the second surface part and the fourth surface part are orthogonal to each other.

8. The workpiece holding mechanism according to claim 1, wherein the workpiece holding mechanism is configured to execute:
   a first operation in which the first arm and/or the second arm operate such that when viewed from a thickness direction of a printed circuit board that is a workpiece, the printed circuit board is located between the fifth support and the sixth support and also between the first support and the second support;
   after the first operation, a second operation in which the first arm and/or the second arm operate such that the first support and the second support approach each other, and the first surface part and the second surface part are respectively brought into contact with a pair of side surfaces of the printed circuit board; and
   after the second operation, a third operation in which the first arm and/or the second arm move in the first direction, and the fifth surface part and the sixth surface part are respectively brought into contact with a pair of side surfaces of the printed circuit board to hold the printed circuit board.

9. The workpiece holding mechanism according to claim 1, further comprising:
   one or more servomotors configured to control a position and/or a movement of the first arm and the second arm; and
   a processor operatively coupled to the one or more servomotors of the first and second arms, the processor being programmed to:
   control a position of the first arm and/or the second arm such that, when viewed from a thickness direction of a printed circuit board that is a workpiece, the printed circuit board is located between: (i) the fifth support and the sixth support, and (ii) the first support and the second support;
   control the position of the first arm and/or the second arm such that the first support and the second support approach each other, and the first surface part and the second surface part are respectively brought into contact with a pair of side surfaces of the printed circuit board; and
   control the first arm and/or the second arm to move in the first direction such that the fifth surface part and the sixth surface part are respectively brought into contact with a pair of side surfaces of the printed circuit board to hold the printed circuit board.

\* \* \* \* \*